(12) United States Patent
Mann

(10) Patent No.: US 7,988,100 B2
(45) Date of Patent: Aug. 2, 2011

(54) WING TIP DEVICE

(75) Inventor: Alan Mann, Bristol (GB)

(73) Assignee: Airbus Operations Limited, Bristol (GB)

( * ) Notice: Subject to any disclaimer, the term of this patent is extended or adjusted under 35 U.S.C. 154(b) by 651 days.

(21) Appl. No.: 12/066,391

(22) PCT Filed: Sep. 12, 2006

(86) PCT No.: PCT/GB2006/003373
§ 371 (c)(1),
(2), (4) Date: Mar. 11, 2008

(87) PCT Pub. No.: WO2007/031732
PCT Pub. Date: Mar. 22, 2007

(65) Prior Publication Data
US 2008/0223991 A1 Sep. 18, 2008

(30) Foreign Application Priority Data
Sep. 14, 2005 (GB) .................................. 0518755.4

(51) Int. Cl.
*B64C 23/06* (2006.01)
(52) U.S. Cl. .................................. 244/199.4; 244/199.2
(58) Field of Classification Search ............... 244/199.4, 244/199.2, 198
See application file for complete search history.

(56) References Cited

U.S. PATENT DOCUMENTS

| | | | |
|---|---|---|---|
| 2,565,990 A * | 8/1951 | Richard | 244/90 R |
| 2,576,981 A | 12/1951 | Vogt | |
| D196,546 S * | 10/1963 | Huntington | D12/333 |
| 4,247,062 A * | 1/1981 | Brueckner | 244/91 |
| 4,262,451 A | 4/1981 | Dallaire | |
| 4,382,569 A * | 5/1983 | Boppe et al. | 244/199.4 |
| 4,714,215 A | 12/1987 | Jupp et al. | |
| 5,072,894 A | 12/1991 | Cichy | |
| 5,267,626 A * | 12/1993 | Tanfield, Jr. | 180/117 |
| 5,407,153 A * | 4/1995 | Kirk et al. | 244/199.4 |
| 6,484,968 B2 * | 11/2002 | Felker | 244/91 |
| 6,619,584 B1 | 9/2003 | Haynes | |
| 6,722,615 B2 | 4/2004 | Heller et al. | |
| 7,475,848 B2 * | 1/2009 | Morgenstern et al. | 244/35 R |
| 2006/0249630 A1 * | 11/2006 | McCarthy | 244/199.4 |
| 2007/0252031 A1 * | 11/2007 | Hackett et al. | 244/4 R |
| 2008/0191099 A1 * | 8/2008 | Werthmann et al. | 244/199.4 |

FOREIGN PATENT DOCUMENTS

| | | |
|---|---|---|
| DE | 202004014384 U | 11/2004 |
| EP | 0094064 A1 | 11/1983 |
| EP | 0122790 A1 | 10/1984 |
| EP | 1493660 A1 | 1/2005 |

OTHER PUBLICATIONS

International Search Report for PCT/GB2006/003373 mailed Dec. 8, 2006.
GB Search Report for GB0518755.4 dated Jan. 10, 2006.

* cited by examiner

*Primary Examiner* — Christopher P Ellis
(74) *Attorney, Agent, or Firm* — Lowe, Hauptman, Ham & Berner, LLP

(57) ABSTRACT

An aircraft includes a wing having a positive dihedral, the wing having a tip and a wing tip device mounted in the region of the tip. The wing tip device is generally downwardly extending and has a region inclined at a cant of more than 180 degrees. The region is arranged to generate lift during flight. The region inclined at a cant of more than 180 degrees may be located at the distal end of the wing tip device. The wing tip may be swept and may aeroelastically deform during flight.

20 Claims, 5 Drawing Sheets

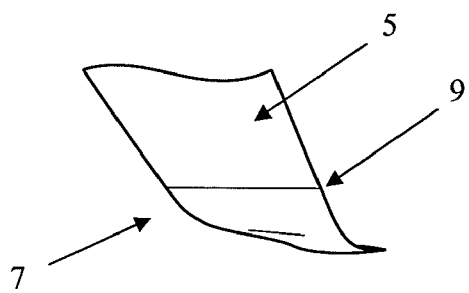
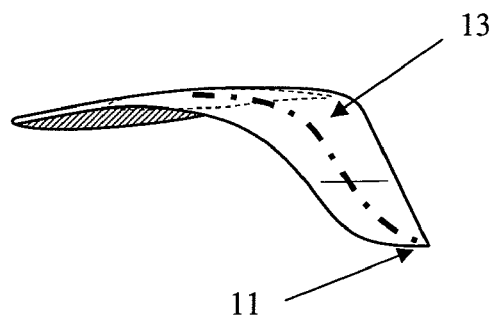
Figure 2a
Figure 2b
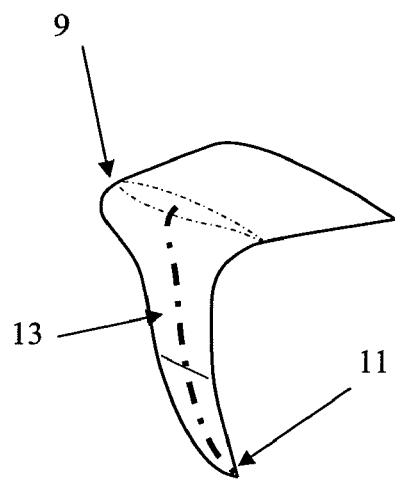
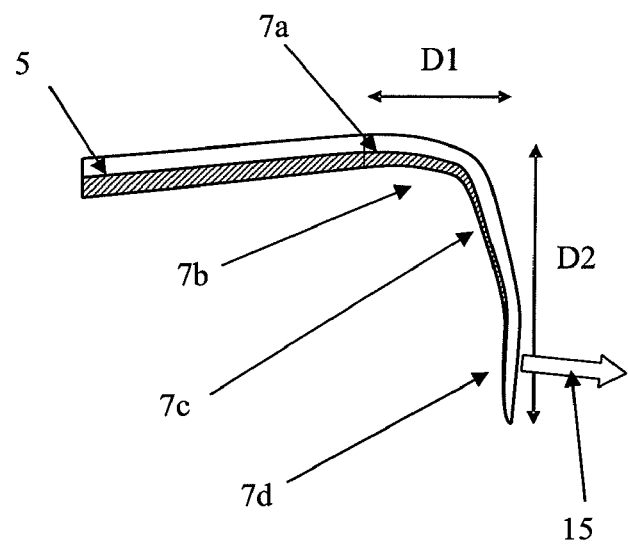
Figure 2c
Figure 2d

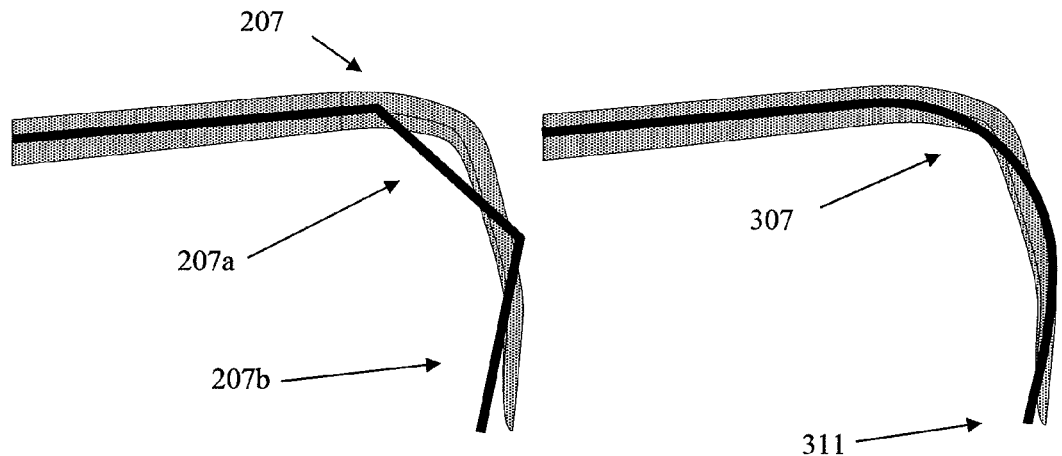
Figure 5a
Figure 5b
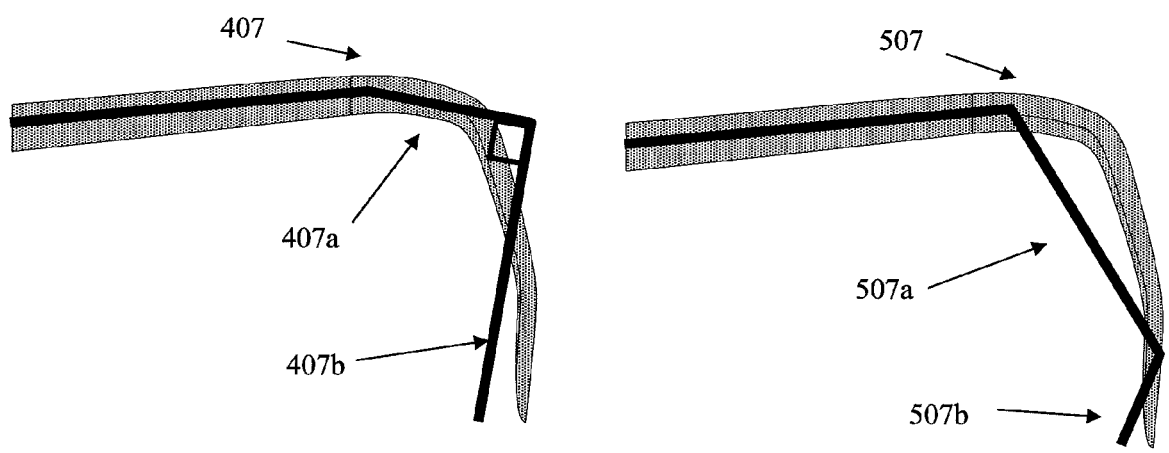
Figure 5c
Figure 5d

WING TIP DEVICE

RELATED APPLICATIONS

The present application is based on International Application Number PCT/GB2006/003373 filed Sep. 12, 2006, and claims priority from British Application Number 0518755.4 filed Sep. 14, 2005, the disclosures of which are hereby incorporated by reference herein in their entirety.

BACKGROUND OF THE INVENTION

The present invention relates to aircraft and more particularly to wing tip devices for use on an aircraft.

The use of wing tip devices, such as winglets and fences, on aircraft is well known. Such devices seek to improve the aerodynamic performance of the aircraft, in particular by reducing drag and increasing lift.

The increase in lift can lead to significant increases in the wing root bending moment. The maximum bending moment to which a wing is expected to be subjected is likely to dictate the required strength of the wing. This in turn may dictate the weight of the wing. Thus, the gains in aerodynamic performance attained by adding a wing tip device have, in aircraft designs of the prior art, tended to be offset by an increase in the structural mass of the aircraft required to cope with the increased wing loading.

It is an object of the present invention to provide an aircraft that is able to benefit from at least some of the improved aerodynamic performance associated with a wing tip device, without incurring too great an increase in the bending moment in the wing.

SUMMARY OF THE INVENTION

The present invention provides an aircraft comprising a wing, the wing comprising a tip and a wing tip device mounted in the region of the tip, the wing tip device being generally downwardly extending and having a region inclined at a cant of more than 180 degrees, the region being arranged to generate lift during flight. The directions/dimensions described herein are, unless otherwise specified, for a fully fuelled aircraft, cruising in horizontal flight. The dihedral is measured from the horizontal. The cant is measured from the vertical, positive cant being measured in the clockwise direction from the upward vertical when viewing the port wing from the front, and negative cant being measured in the anti-clockwise direction from the upward vertical when viewing the port wing from the front. It will also be understood that lift refers to the force in a direction normal to the surface generating the lift. Thus, according to the present invention, the region inclined at a cant of more than 180 degrees is arranged to generate a force (referred to herein as "lift") in a direction at a cant of more than 90 degrees (i.e. having a downward component).

The present invention thereby provides an aircraft which can benefit from the drag reduction afforded by the wing tip device whilst not suffering too great an increase in bending moment in the wing, particularly at the wing root. Preferably the bending moment in the wing, and particularly at the wing root, during use is, in fact, reduced by the presence of the wing tip device.

The present invention may be of benefit during both steady level flight and high-lift manoeuvres generating for example 2.5 g. The benefits afforded by the invention are preferably in comparison to an aircraft having an upwardly facing wing tip device. The benefits of the invention may be in comparison to, for example, an aircraft having a Kuchemann wing tip device or an aircraft with no wing tip device.

It will be understood that the wing tip device need not be mounted at the tip of the wing, but may for example be mounted at a position in the region of, but spaced apart from, the tip of the wing. The region of the wing in which the tip device may be located may be the end 10%, by area, of the wing. The wing tip device may be a retro-fit device mounted on the tip of the wing, but may alternatively be an integral part of the wing structure. The wing tip device may be fully blended with the wing.

Reference to a cant of more than 180 degrees will be understood to mean a more positive angle than 180 degrees. For example the region may be inclined at a cant of 185 degrees, or 200 degrees. Advantageously there is an upper limit to the cant of the region. Preferably the region is inclined at a cant of less than 270 degrees. Yet more preferably the region is inclined at a cant of less than 210 degrees.

Advantageously the majority of the wing tip device is in the form of a generally downwardly extending portion. Preferably the downwardly extending portion and the remainder of the wing tip device, meet at a junction, wherein the junction is open. As will be understood by the person skilled in the art, a junction is to be regarded as open if the change in angle from a portion on one side of the junction to a portion on the other side of the junction is more than 90 degrees. An open junction is thought to be particularly beneficial as it generates a low viscous drag.

The first aspect of the present invention is particularly of benefit for aircraft having wings with a positive dihedral. Advantageously the wing has a positive dihedral.

The geometry of the wing tip device is preferably defined by viewing the wing tip device as comprising a proximal end and a distal end, and the wing tip device containing a notional line starting at the proximal end and extending to the distal end and passing, at all points, through 50% local chord. Thus, a part of the wing tip device may be defined with reference to the portion of the notional line that passes through that part. For example, the part of the wing tip device between 0% and 30% notional line will be understood to refer to the part of the wing tip device between the proximal end and the chordwise line intersecting 30% of the way along the notional line.

The proximal end of the wing tip device may, if not self evident, be identified by locating the part of the wing at which the wing geometry deviates from the geometry it would take were there to be no wing tip device.

Preferably the region inclined at a cant of more than 180 degrees is not located in the vicinity of the proximal end. More preferably the region inclined at a cant of more than 180 degrees is not located in the part of the wing tip device between the 0% and 10% notional line. Yet more preferably the region inclined at a cant of more than 180 degrees is not located in the part of the wing tip device between 0% and 30% notional line.

The region inclined at a cant of more than 180 degrees may, at least partially, be located between 50% and 100% notional line. Preferably, the region inclined at a cant of more than 180 degrees is, at least partially, located between 70% and 100% notional line. Yet more preferably the region inclined at a cant of more than 180 degrees is located in the vicinity of the distal end.

It is thought that a generally downwardly extending device has an improved roll-up characteristic, in that the tip vortex core tends to be more outboard during use, than on the equivalent upwardly extending device.

The chord of the wing tip device at the proximal end is preferably the same as the chord of the wing at the wing tip.

The chord of the wing tip device preferably decreases between the proximal end and the distal end. Advantageously the wing tip device has a relatively small average chord, thereby causing a relatively low friction drag to be created during flight.

Preferably the wing tip device extends in a spanwise direction from the proximal end, a distance between 3% and 15% of the aircraft span, and yet more preferably a distance between 5% and 10% of the aircraft span.

Advantageously the wing tip device extends in a vertical direction from the proximal end, a distance between 3% and 15% of the aircraft span. The wing tip device more preferably extends in a vertical direction from the proximal end, a distance between 5% and 10% of the aircraft span. The vertical extent of the wing tip device from the proximal end advantageously complies with aircraft ground handling requirements.

Advantageously the wing tip device is a sacrificial component. Thus, the wing tip device is preferably arranged to detach from the wing when subjected to a load exceeding a certain value, for example on impact with a foreign structure during aircraft taxiing.

The wing tip device need not be a smoothly varying shape. The wing tip device may contain a plurality of discrete elements, at least one element being located in the region inclined at a cant of more than 180 degrees. Advantageously at least one discrete element defines the region inclined at a cant of more than 180 degrees.

Advantageously the wing tip device leading edge is swept. Preferably the sweep of the wing tip device is equal to the sweep of the wing. On a conventional aircraft, when the wing loading increases, the twist of the wing tip tends to decrease due to aeroeleastic deformation of the wing. Thus, on an aircraft according to the present invention having similar aeroelastic wing behaviour, when the wing loading is increased, the effective sweep of the device (which is downwardly extending) increases, reducing its lift curve slope relative to a rigid wing. Therefore as the wing distorts aeroelastically, the loads generated by the wing tip device tend to decrease, reducing the maximum load on the wing tip device during a high load manoeuvre. This is beneficial for a number of reasons. For example, the loads on the outer wing structure may be kept within an acceptable level during high load manoeuvres, and the potential penalty due to the tip device becoming inclined at a cant of less than 180 degrees during such a manoeuvre is reduced.

The aeroelastic behaviour of the aircraft of the present invention may also provide other benefits. Preferably the wing and/or wing tip device deforms, during use, to provide the aircraft with a larger span in comparison to when the aircraft is stationary on the ground, thereby reducing the induced drag encountered by the aircraft.

The present invention is of greater application to larger aircraft. The aircraft is preferably of a size equivalent to an aircraft designed to carry more than 50 passengers, and more preferably more than 100 passengers.

According to another aspect of the invention, there is provided a wing including a wing tip device, the wing and wing tip device being arranged in accordance with the wing of the aircraft of the present invention.

According to yet another aspect there is provided a wing tip device, the wing tip device being arranged in accordance with the wing tip device of the aircraft of the present invention.

According to further aspect there is provided a kit of parts including a wing tip device, the parts being suitable for converting an aircraft into an aircraft according to the present invention.

According to yet another aspect there is provided a wing tip device, a wing and/or an aircraft arranged substantially in accordance with any of the embodiments described herein.

DESCRIPTION OF THE DRAWINGS

Various embodiments of the invention will now be described, by way of example only, with reference to the accompanying schematic drawings of which:

FIGS. 2a to 2d are views of the wing tip device on the aircraft according to the first embodiment;

FIGS. 4a and 4b show the wing tip device of the first embodiment during two flight conditions;

FIGS. 5a to 5d are views of a wing tip device according to other embodiments.

DETAILED DESCRIPTION

Figure 1:
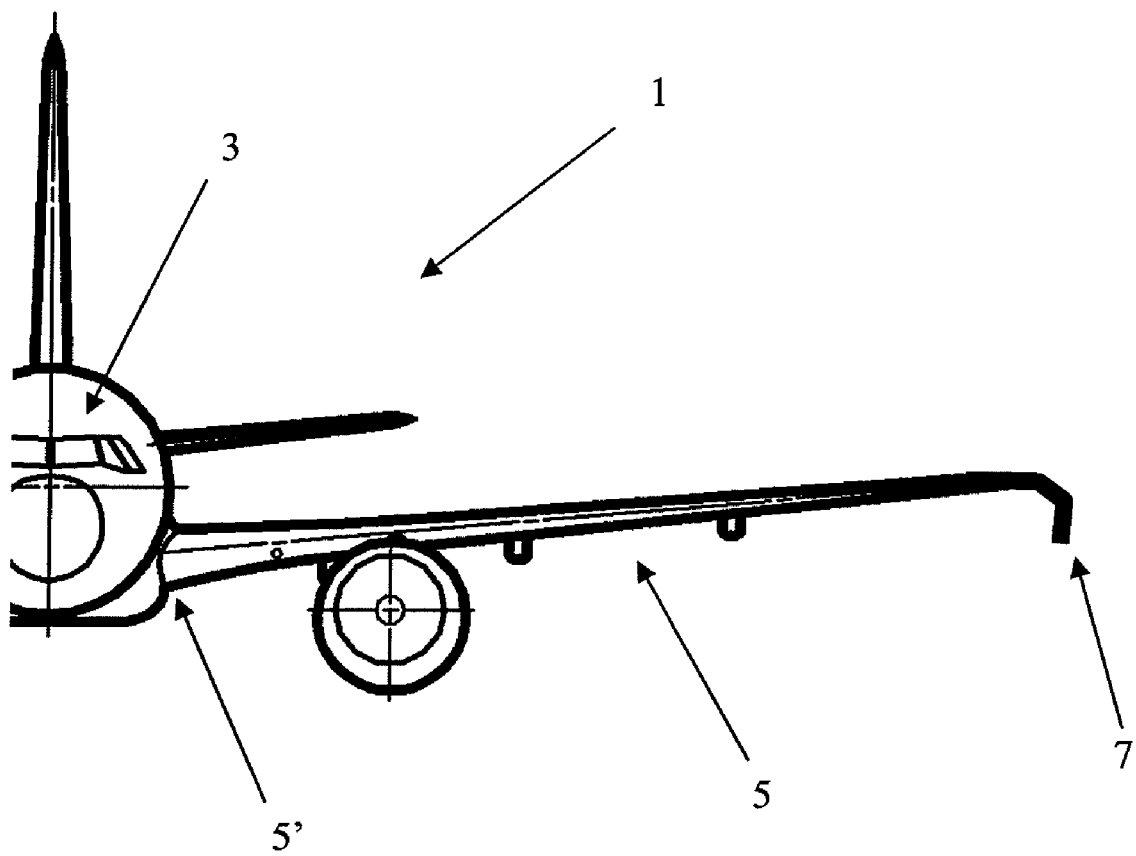
FIG. 1 is a front view of part of an aircraft according to a first embodiment of the invention.

FIG. 1 is a front view of one half of an aircraft 1 according to a first embodiment of the invention. The aircraft comprises a fuselage 3, a wing 5 having a positive dihedral of seven degrees, and a wing tip device 7 located at the tip of the wing 5. The aircraft is shown flying at cruise speed in horizontal flight.

Referring to FIGS. 2a to 2d, the wing tip device 7 comprises a proximal end 9 and a distal end 11. The wing tip device 7 is connected to the wing 5 at the proximal end 9. At the proximal end the device is contiguous to the tip of the wing 5, and the respective chord lengths of the wing 5 and the wing tip 7 at this location are equal. The wing tip device 7 is thus blended with the wing 5.

According to the first embodiment the wing tip device has been retrofitted onto the aircraft, replacing a previous tip device. The connection (not shown) between the device 7 and the wing 5 is such that the device will shear off if it hits a foreign object with sufficient force, for example, if it hits a structure during taxiing on a runway. As is known in the art, the wing tip device 7 is therefore a sacrificial component.

When defining the shape of the wing tip device, a notional line 13 may be thought of as extending from the proximal end 9 to the distal end 11, the line 13 passing at all points through 50% chord. The parts of the wing tip device bounded by percentage values of the notional line 13, are the parts of the wing tip device bounded by the chordwise lines intersecting those percentage values of the notional line 13, 0% being the proximal end and 100% being the distal end.

The wing tip device comprises discrete elements 7a, 7b, 7c and 7d. A first element 7a is located between the proximal end 9 and 12% notional line and is broadly aligned with the wing 5. At the proximal end the wing tip device 7 is connected to the wing tip. The second, third and fourth elements 7b, 7c, 7d are generally downwardly extending. The second element 7b is located between 12% and 35% notional line and is inclined at a cant of 100 degrees. The third element 7c is located yet further along the wing tip device 7, between 35% and 80% notional line, and is inclined at a cant of 170 degrees. The fourth element 7d is inclined at a cant of 185 degrees and is located between 80% notional line and the distal end of the wing tip device 7.

The wing tip device 7 extends in a spanwise direction from the proximal end, a distance D1 equal to 5% of the aircraft span. The device 7 extends in a vertical direction a distance D2 equal to 7% span. The geometry of the wing tip device therefore complies with aircraft ground handling regulations for its intended application.

The wing tip device has an aerofoil cross-section and each element therefore generates a lift force during flight. The fourth element 7d, inclined at a cant of more than 180 degrees, produces a lift force 15 at a cant of more than 90 degrees, in this case 95 degrees.

In a similar manner to known, upwardly pointing devices, the wing tip device 7 allows wing tip vortices generated during flight to be moved away from the aircraft, thereby reducing induced drag. In addition, the wing tip device tends to increase the lift generated in the region of the wing tip, for example by increasing the 2-D flow over the wing tip. In known wing tip devices, an increase in lift caused by the device may have resulted in a structural mass penalty on the aircraft due to required strengthening of the wing root. Use of the wing tip device 7 on the aircraft according to the present invention however, does not result in such a structural penalty. The wing tip device 7, and in particular the fourth element 7d is so arranged that the lift generated by the device acts to reduce the bending moment in the wing 5, particularly at the wing root 5', that is caused by the lift generated by the wing.

Figure 3:
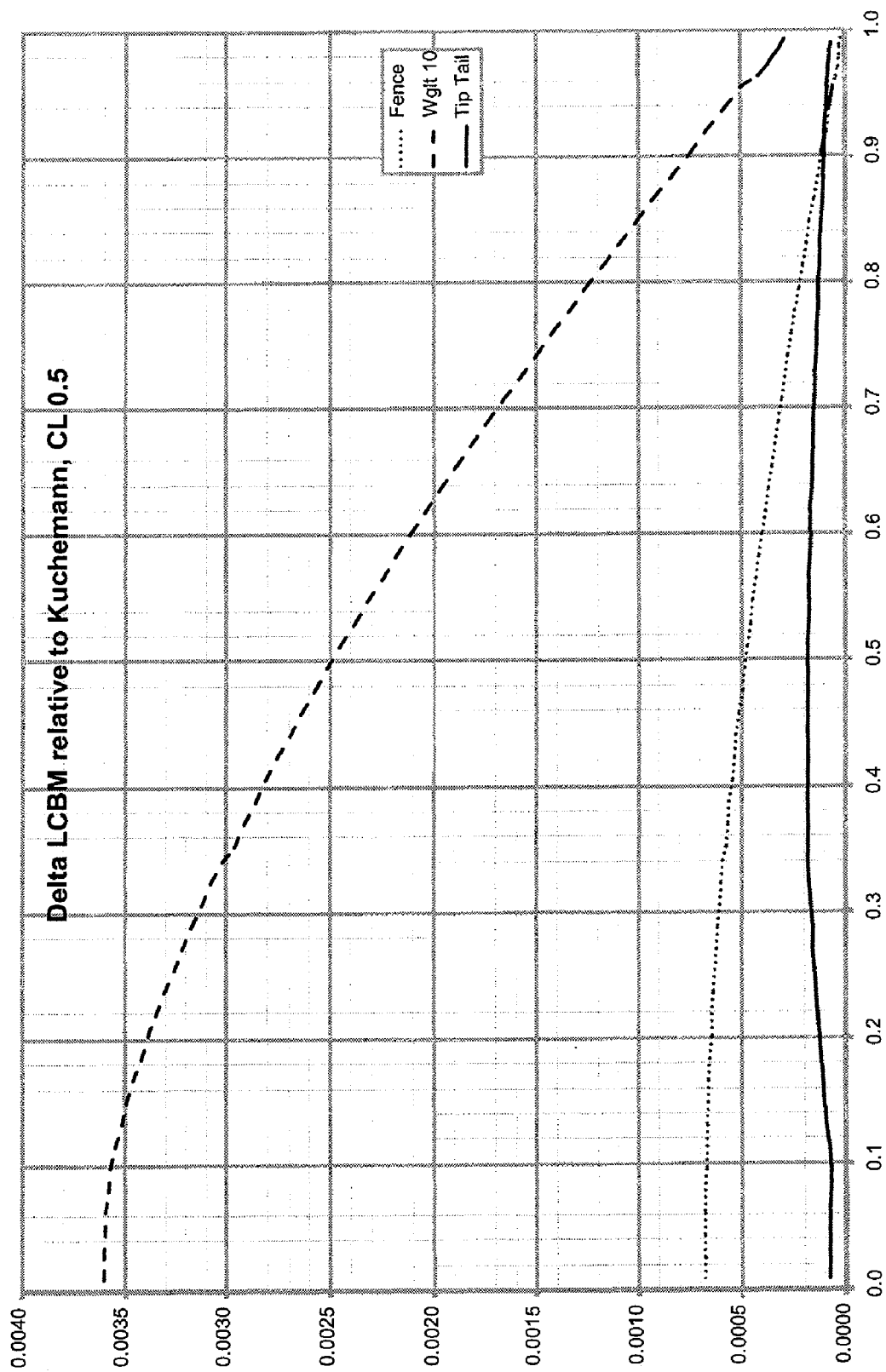
FIG. 3 is a graph showing the change in bending moment along a wing with various wing tip devices, as compared to a wing with a Kuchemann wing tip device.

FIG. 3 is a graph of the change in bending moment along a wing, when compared to a wing with a Kuchemann wing tip device. The graph shows data for a wing with a fence, a winglet and the wing tip device according to the present invention (labelled Tip Tail). It will be appreciated that the increase in wing bending moment on an aircraft according to the present invention is considerably less than that on an aircraft with an upwardly extending winglet or fence. According to the present invention, the extra wing bending moment caused by the extra lift due to the presence of the wing tip device is almost offset by the reduction in bending moment caused by the lift generated on the downwardly extending portions of the wing tip device. The structural mass of the wing root need not therefore be significantly increased if the wing tip device 7 is used.

It is also thought that the provision of a downwardly extending device means that the wing tip vortex roll-up will tend to move outboard, thus improving the wing tip vortex spacing and further reducing the induced drag. Furthermore the wing tip device 7 is arranged to aeroelastically deform to a larger span when loaded during flight thereby moving the wing tip vortices yet further outboard.

Figure 4B:
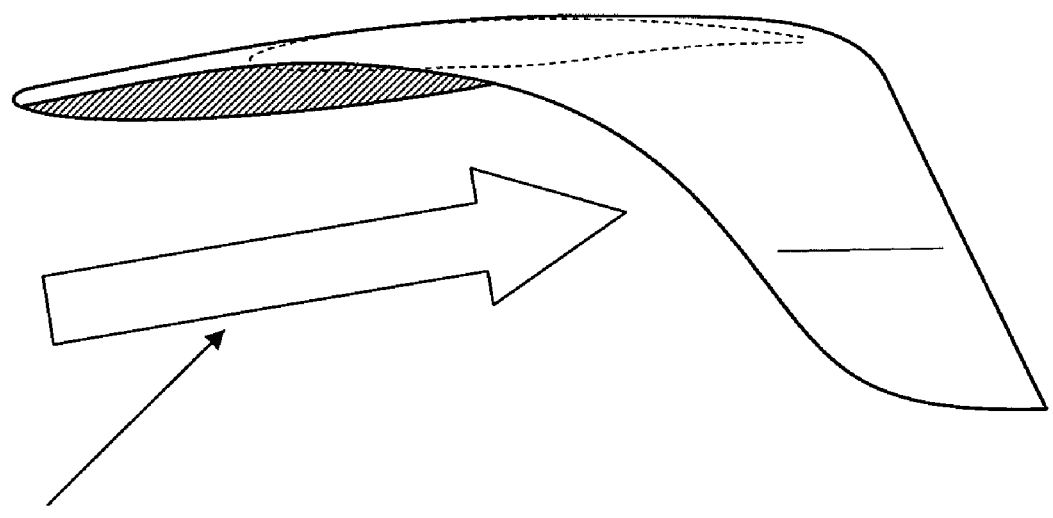
Figure 4B:
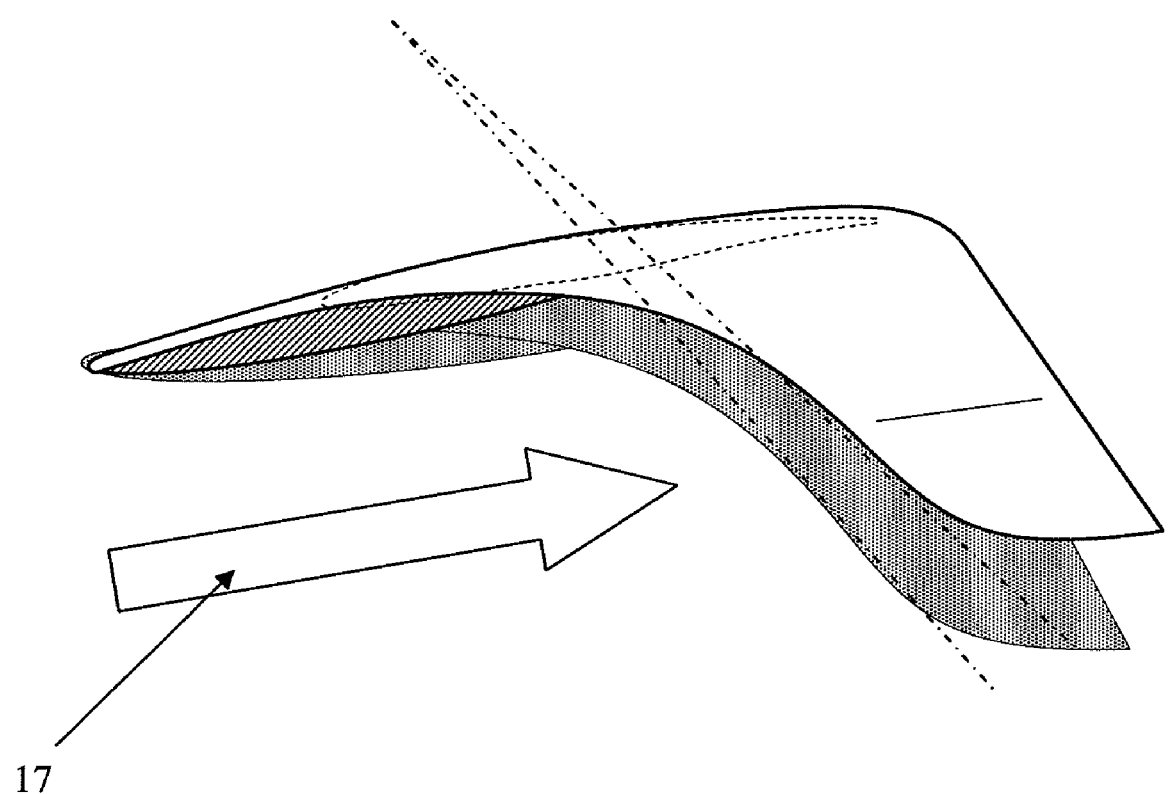

Referring to FIGS. 4a and 4b, the leading edge of the wing tip device 7 is swept aft at an angle of sweep of 35 degrees. In the first embodiment the sweep is the same sweep as the wing 5. FIG. 4a shows the wing tip device during cruise conditions, the air flow being indicated by the large arrow 17. The device is designed such that at high wing loads the device remains below stall conditions.

FIG. 4b shows the wing tip device during a high-load condition, the air flow being indicated by the large arrow 17 and the cruise position of the wing tip device being shaded. As shown in FIG. 4b, the sweep of the device effectively increases with increasing load, due to wing aeroelastic deformation. The lift generated by the wing tip device therefore reduces with increasing load.

The wing tip device is relatively lightly loaded at cruise in accordance with standard wing tip device design rules. However, since the load on the tip device tends to decrease with wing aeroelastic distortion during a high load manoeuvre (as described above), the loading at cruise can be designed to be somewhat higher than on a standard wing tip device. This reduces the cruise drag by providing an aerodynamic load distribution on the wing that is closer to the elliptic ideal, and by moving the tip vortex core further outboard. As the skilled person will appreciate, this is specifically a characteristic of a downwardly extending device.

The chord of the wing tip device steadily decreases along the notional line 13. Having a relatively small chord lessens the friction drag created by the wing tip device 7.

FIGS. 5a to 5d show four wing tip devices according to other embodiments of the present invention. Referring to FIG. 5a, the wing tip device 207 comprises only two elements 207a and 207b of equal length. The first element 207a is inclined at a cant of 140 degrees and the second element 207b is inclined at a cant of 190 degrees.

Referring to FIG. 5b, the wing tip device 307 does not comprises discrete elements, but is instead smoothly curved. The region between the distal end 311 and 85% notional line (not shown) is inclined at a cant of more than 185 degrees.

Referring to FIG. 5c, the wing tip device 407 comprises two elements 407a and 407b. The first element 407a is considerably shorter than the second element 407b. The first element 407a is inclined at a cant of 100 degrees and the second element 407b is inclined at a cant of 190 degrees.

Referring to FIG. 5d, the wing tip device 507 comprises two elements 507a and 507b. The first element 507a is considerably longer than the second element 507b. The first element 507a is inclined at a cant of 160 degrees and the second element 507b is inclined at a cant of 200 degrees.

It will be appreciated that in all of the above embodiments, the part of the wing tip device close to the proximal end does not contain the region inclined at a cant of more than 180 degrees. The junction between the wing and the wing tip device is therefore open. An open junction is particularly beneficial as it generates a particularly low viscous drag during flight.

Whilst the present invention has been described with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft comprising a wing, the wing comprising a tip and a wing tip device mounted in the region of the tip, the wing tip device being generally downwardly extending and having a region inclined at a cant of more than 180 degrees, the region being arranged to generate lift during flight, wherein the wing tip device comprises a plurality of discrete elements, at least one element being located in the region inclined at a cant of more than 180 degrees.

2. An aircraft according to claim 1, wherein the wing has a positive dihedral.

3. An aircraft according to claim 1, wherein the region inclined at a cant of more than 180 degrees is inclined at a cant of less than 270 degrees.

4. An aircraft according to claim 1, the wing tip device comprising a proximal end and a distal end, wherein the wing tip device extends in a spanwise direction from the proximal end, a distance between 3% and 15% of the aircraft span.

5. An aircraft according to claim 1, the wing tip device comprising a proximal end and a distal end, wherein the wing tip device extends in a vertical direction from the proximal end, a distance between 3% and 15% of the aircraft span.

6. An aircraft according to claim 1, wherein the wing tip device leading edge is swept.

7. An aircraft according to claim 1, wherein at least one of the wing or the wing tip device is arranged to deform during use, to provide the aircraft with a larger span in comparison to when the aircraft is stationary.

8. An aircraft, comprising a fuselage and a wing attached to the fuselage,
the wing comprising a tip and a wing tip device,
the wing tip device being generally downwardly extending and having a region inclined at a cant of more than 180 degrees, said region being arranged to generate lift during flight,
the wing tip device comprising a proximal end and a distal end, the proximal end being attached to the tip of the wing,
wherein said region is not located in the vicinity of the proximal end, and wherein the wing tip device comprises a plurality of discrete elements which are serially connected to each other from the proximal end to the distal end, and at least one of which defines said region.

9. An aircraft according to claim 8, wherein the wing has a positive dihedral.

10. An aircraft according to claim 8, wherein said region is inclined at a cant of less than 270 degrees.

11. An aircraft according to claim 8, wherein
the wing tip device contains a notional line starting at the proximal end, extending to the distal end and passing, at all points, through 50% local chord of the wing tip device, and
said region is not located between the proximal end and 30% of the notional line.

12. An aircraft according to claim 8, wherein
the wing tip device contains a notional line starting at the proximal end, extending to the distal end and passing, at all points, through 50% local chord of the wing tip device, and
said region is, at least partially, located between 50% of the notional line and the distal end.

13. An aircraft according to claim 12, wherein said region is located in the vicinity of the distal end.

14. An aircraft according to claim 8, wherein a distance in a spanwise direction from the proximal end to the distal end of the wing tip device is between 3% and 15% of the aircraft span.

15. An aircraft according to claim 8, wherein a distance in a vertical direction from the proximal end to the distal end of the wing tip device is between 3% and 15% of the aircraft span.

16. An aircraft according to claim 8, wherein the wing tip device has a leading edge that is swept.

17. An aircraft according to claim 8, wherein at least one of the wing or the wing tip device is arranged to deform during use, to provide the aircraft with a larger span in comparison to when the aircraft is stationary.

18. A wing including a wing tip device, the wing and wing tip device being arranged in accordance with the wing of the aircraft according to claim 8.

19. A wing tip device arranged in accordance with the wing tip device of the aircraft according to claim 8.

20. An aircraft, comprising a fuselage and a wing attached to the fuselage,
the wing comprising a tip and a wing tip device,
the wing tip device being generally downwardly extending and having a region inclined at a cant of more than 180 degrees, said region being arranged to generate lift during flight,
the wing tip device comprising a proximal end and a distal end, the proximal end being attached to the tip of the wing,
wherein said region is closer to the distal end than to the proximal end, and wherein the wing tip device comprises a plurality of discrete elements, at least one element being located in the region inclined at a cant of more than 180 degrees.

* * * * *